United States Patent
Govender et al.

(10) Patent No.: US 12,497,372 B2
(45) Date of Patent: Dec. 16, 2025

(54) OXYGENATED HYDROCARBON PRODUCTION SYSTEM WITH ACIDIC IMPURITY REMOVAL RESIN COLUMN

(71) Applicant: SipChem Sahara International Petrochemical Company JSC, Al-Khobar (SA)

(72) Inventors: Nilenindran Sundra Govender, Al-Khobar (SA); R. Balasubramanian, Al-Khobar (SA); Sibusiso Mtongana, Al-Khobar (SA)

(73) Assignee: SipChem Sahara International Petrochemical Company JSC, Al-Khobar (SA)

( * ) Notice: Subject to any disclaimer, the term of this patent is extended or adjusted under 35 U.S.C. 154(b) by 455 days.

(21) Appl. No.: 18/187,494

(22) Filed: Mar. 21, 2023

(65) Prior Publication Data

US 2024/0317697 A1     Sep. 26, 2024

(51) Int. Cl.
| | | |
|---|---|---|
| C07D 307/20 | (2006.01) |
| B01J 19/24 | (2006.01) |
| B01J 41/07 | (2017.01) |
| B01J 41/14 | (2006.01) |
| B01J 47/02 | (2017.01) |
| B01J 49/07 | (2017.01) |
| B01J 49/57 | (2017.01) |
| C07C 29/17 | (2006.01) |
| C07D 307/08 | (2006.01) |

(52) U.S. Cl.
CPC ......... *C07D 307/20* (2013.01); *B01J 19/245* (2013.01); *B01J 41/07* (2017.01); *B01J 41/14* (2013.01); *B01J 47/02* (2013.01); *B01J 49/07* (2017.01); *B01J 49/57* (2017.01); *C07C 29/177* (2013.01); *C07D 307/08* (2013.01)

(58) Field of Classification Search
CPC ................................... C07D 307/20
See application file for complete search history.

(56) References Cited

U.S. PATENT DOCUMENTS

| | | |
|---|---|---|
| 4,767,869 A | 8/1988 | Harrison et al. |
| 6,274,743 B1 | 8/2001 | Tuck et al. |
| 6,284,904 B1 | 9/2001 | Ponnampalam |
| 9,464,026 B2 | 10/2016 | Stensrud et al. |
| 9,776,948 B2 | 10/2017 | Smidt et al. |

OTHER PUBLICATIONS

His Markit ; 1,4-Butanediol from Maleic Anhydride via Dimethyl Maleate ; https://ihsmarkit.com/products/chemical-technology-pep-revies-butanediol-from-maleic.html ; May 20, 2021 ; 2 Pages.
Eychenne et al. ; Deacidification of a Synthetic Oil with an Anion Exchange Resin ; JAOCS, vol. 75, No. 10 ; 1998 ; 4 Pages.

*Primary Examiner* — Golam M Shameem
(74) *Attorney, Agent, or Firm* — Oblon, McClelland, Maier & Neustadt, L.L.P.

(57) ABSTRACT

An oxygenated hydrocarbon production system for producing an oxygenated hydrocarbon selected from tetrahydrofuran, 1,4-butanediol, and gamma butyrolactone using maleic anhydride. The oxygenated hydrocarbon production system first converts maleic anhydride to a monoester, then converts the monoester to a diester, passes the diester through an anion exchange resin to remove acid-containing species such as the monoester, then hydrogenates the diester to the oxygenated hydrocarbon. The anion exchange resin may be regenerated using a regeneration subsystem which contains a regeneration solution containing a strong base. The system is used in a method of producing an oxygenated hydrocarbon from maleic anhydride.

12 Claims, 4 Drawing Sheets volume of DMM passing column packed with 220 ml fresh resin 1

OXYGENATED HYDROCARBON PRODUCTION SYSTEM WITH ACIDIC IMPURITY REMOVAL RESIN COLUMN

BACKGROUND OF THE INVENTION

Field of the Invention

The present disclosure relates to an oxygenated hydrocarbon production system and a method of producing an oxygenated hydrocarbon.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Carboxylic acids, particularly the $C_4$ dicarboxylic acids such as maleic acid, fumaric acid, succinic acid, and acetylenedicarboxylic acid, and derivatives thereof, play critical roles in the chemical industry. These chemicals serve as precursors or feedstocks for a wide variety of other chemicals and materials, from pharmaceuticals to plastics. One of the most important examples is the use of maleic acid (or maleic anhydride) in the production of tetrahydrofuran, 1,4-butanediol, and gamma butyrolactone. This reaction used to make these compounds involves the formation of a maleic acid diester, such as dimethylmaleate (DMM), which is then hydrogenated to produce tetrahydrofuran, 1,4-butanediol, and gamma butyrolactone.

However, during hydrogenation reactions, the hydrogenation catalyst can be deactivated due to acid attack and needs to be protected from organic acidic species. In the DMM production step, the acidic species can be in a form of, for example, unreacted monomethylmaleate (MMM). Moreover, acidity contributes to polymer formation in the vaporizer, transfer piping, and in the hydrogenation reactor as well. Such polymer formation can cause hydrogenation catalyst pore blockages, ultimately preventing the DMM reagent from reaching the active sites of the hydrogenation catalyst. This contributes to high pressure drop in the vaporizer due to plugging of packing and increased rate of polymer deposition on the hydrogenation reactor catalyst top section. Beyond a certain value of pressure drop, it becomes difficult to run the unit or the operating conditions become unsafe. This necessitates a plant shutdown for vaporizer cleaning and hydrogenator skimming. Polyester formation is a known phenomenon in hydrogenation of ester industrial processes (see Willett, Paul, 2002, Heterogeneous catalytic hydrogenation and purification applied to commercial processes, Durham theses, Durham University).

In view of the forgoing, there exists a need for new systems and methods that avoid or minimize hydrogenation catalyst deactivation and polymer formation.

SUMMARY OF THE INVENTION

The present disclosure relates to a method of producing an oxygenated hydrocarbon, the method comprising monoesterifying maleic anhydride with a monoesterification alcohol having 1 to 3 carbon atoms to form a monoester stream comprising a maleic acid monoester, diesterifying the maleic acid monoester with a diesterification alcohol having 1 to 3 carbon atoms to form a crude diester stream comprising a maleic acid diester, passing the crude diester stream through an anion exchange resin to form a deacidified diester stream and an acidified resin, and hydrogenating the deacidified diester stream using hydrogen gas and a hydrogenation catalyst to form an oxygenated hydrocarbon, wherein the oxygenated hydrocarbon is at least one selected from the group consisting of tetrahydrofuran, 1,4-butanediol, and gamma butyrolactone, and the deacidified diester stream comprises less than 0.5 mol % maleic acid monoester based on a total number of moles of maleic anhyride derivatives present in deacidified diester stream.

In some embodiments, the monoesterification alcohol having 1 to 3 carbon atoms and the diesterification alcohol having 1 to 3 carbon atoms are methanol.

In some embodiments, the anion exchange resin is a weakly basic anion exchange resin.

In some embodiments, the weakly basic anion exchange resin comprises polymer beads comprising primary, secondary, and/or tertiary amine functional groups.

In some embodiments, the polymer beads are polystyrene beads.

In some embodiments, the polymer beads have a mean size of 250 to 750 µm.

In some embodiments, the polymer beads comprise tertiary amine functional groups.

In some embodiments, the method further comprises regenerating the anion exchange resin by washing the acidified resin with a strong base solution comprising a hydroxide base to reform the anion exchange resin.

In some embodiments, the hydroxide base is an alkali metal hydroxide base.

In some embodiments, the crude diester stream comprises the maleic acid monoester and the maleic acid diester.

In some embodiments, the maleic acid monoester is present in an amount of greater than 0.5 mol % to 10 mol %, based on a total number of moles of maleic anhydride derivatives present in the crude diester stream.

In some embodiments, the crude diester stream is substantially free of sulfur-containing substances.

The present disclosure also relates to an oxygenated hydrocarbon production system, comprising a monoesterification reactor, one or more diesterification reactors, one or more anion exchange resin columns, and a hydrogenation reactor. The monoesterification reactor comprises a maleic anhydride inlet, a monoesterification alcohol inlet, and one or more monoester outlets, the monoesterification reactor configured to receive a maleic anhydride stream and a monoesterification alcohol stream comprising an alcohol having 1 to 3 carbon atoms, convert the maleic anhydride and alcohol to a monoester, and provide a monoester stream. The diesterification reactors each comprise a monoester inlet fluidly connected to the monoester outlet of the monoesterification reactor, a diesterification alcohol inlet, a crude diester outlet, and a diesterification waste outlet, each diesterification reactor configured to receive a diesterification alcohol stream comprising an alcohol having 1 to 3 carbon atoms and the monoester stream from the monoesterification reactor, convert the monoester and alcohol to a diester, and provide a crude diester stream. The anion exchange resin columns each comprise a diester inlet fluidly connected to at least one of the crude diester outlets of one or more of the diesterification reactors, an anion exchange resin, and a deacidified diester outlet, each anion exchange resin column configured to receive the crude diester stream from one or more of the diesterification reactors, pass the crude diester stream through the anion exchange resin to form a deacidified diester and an acidified resin, and provide a deacidified diester stream. The hydrogenation reactor comprises a deacidified diester inlet fluidly connected to at least one of the deacidified diester outlets of one or more of the anion exchange resin columns, a hydrogenation catalyst, a hydrogen-containing gas mixture input, and an oxygenated hydrocarbon outlet, the hydrogenation reactor configured to receive the deacidified diester stream from one or more of the anion exchange resin columns and a hydrogen-containing gas mixture, hydrogenate the diester, and provide an oxygenated hydrocarbon stream comprising an oxygenated hydrocarbon. The oxygenated hydrocarbon is at least one selected from the group consisting of tetrahydrofuran, 1,4-butanediol, and gamma butyrolactone.

In some embodiments, the monoesterification alcohol having 1 to 3 carbon atoms and the diesterification alcohol having 1 to 3 carbon atoms are methanol.

In some embodiments, the anion exchange resin is a weakly basic anion exchange resin.

In some embodiments, the weakly basic anion exchange resin comprises polymer beads comprising primary, secondary, and/or tertiary amine functional groups.

In some embodiments, the polymer beads have a mean size of 250 to 750 µm.

In some embodiments, the polymer beads are polystyrene beads.

In some embodiments, the polymer beads comprise tertiary amine functional groups.

In some embodiments, the oxygenated hydrocarbon production system further comprises an anion exchange resin regeneration subsystem, comprising a regeneration solution storage tank, a regeneration solution comprising a strong base, and a depleted solution disposal unit, wherein the regeneration solution flows from the regeneration solution storage tank through one or more anion exchange resin columns containing the acidified resin, thereby forming the anion exchange resin and a depleted solution, the depleted solution flowing to the depleted solution disposal unit.

In some embodiments, the strong base is an alkali metal hydroxide.

In some embodiments, the crude diester stream comprises monoester.

In some embodiments, the monoester is present in the crude diester stream in an amount of greater than 0.5 mol % to 10 mol %, based on a total number of moles of maleic anhydride derivatives present in the crude diester stream.

In some embodiments, the crude diester stream is substantially free of sulfur-containing substances.

In some embodiments, the deacidified diester stream comprises less than 0.5 mol % monoester based on a total number of moles of maleic anhydride derivatives present in the deacidified diester stream.

DETAILED DESCRIPTION OF THE INVENTION

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %, 0 mol %).

As used herein, the phrase "substantially free", unless otherwise specified, describes a particular component being present in an amount of less than about 1 wt %, preferably less than about 0.5 wt %, more preferably less than about 0.1 wt %, even more preferably less than about 0.05 wt %, even more preferably less than about 0.01 wt %, even more preferably less than about 0.001 wt %, yet even more preferably 0 wt %, relative to a total weight of the composition being discussed.

Oxygenated Hydrocarbon Production System

According to a first aspect, the present disclosure relates to an oxygenated hydrocarbon production system, comprising a monoesterification reactor, one or more diesterification reactors, one or more anion exchange resin columns, and a hydrogenation reactor. The oxygenated hydrocarbon is at least one selected from the group consisting of tetrahydrofuran, 1,4-butanediol, and gamma butyrolactone. A schematic drawing of an exemplary embodiment of the oxygenated hydrocarbon production system of the present disclosure is shown in FIG. 1.

Figure 1:
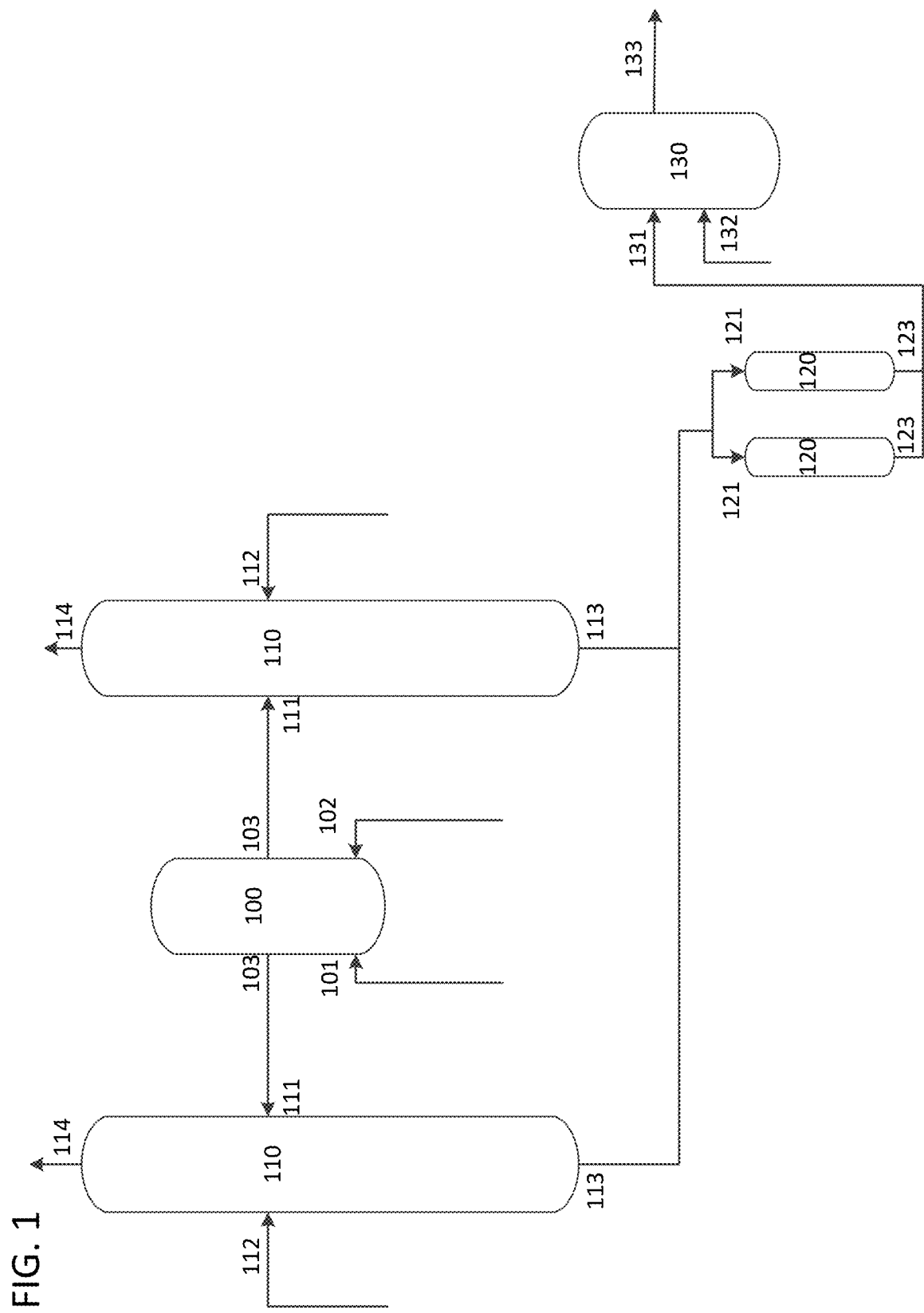
FIG. 1 shows a schematic drawing of an exemplary embodiment of the oxygenated hydrocarbon production system.

Referring to FIG. 1, the monoesterification reactor (100) comprises a maleic anhydride inlet (101), a monoesterification alcohol inlet (102), and one or more monoester outlets (103). The monoesterification reactor (100) is configured to receive a maleic anhydride stream and a monoesterification alcohol stream comprising an alcohol having 1 to 3 carbon atoms, convert the maleic anhydride and alcohol to a monoester, and provide a monoester stream. The diesterification reactors (110) each comprise a monoester inlet (111) fluidly connected to the monoester outlet (103) of the monoesterification reactor (100), a diesterification alcohol inlet (112), a diester outlet (113), a diesterification waste outlet (114). Each diesterification reactor (110) is configured to receive a diesterification alcohol stream comprising an alcohol having 1 to 3 carbon atoms and the monoester stream from the monoesterification reactor (100), convert the monoester and alcohol to a diester, and provide a crude diester stream. In some embodiments, the system comprises one diesterification reactor. In some embodiments, the system comprises two diesterification reactors. In general, there is no limit to the number of diesterification reactors which may be present in the system. The diesterification reactors may be connected in series (sequentially) or in parallel. In some embodiments, each diesterification reactor is substantially similar (e.g. having the same components, connectivity, dimensions, etc). In general, any suitable type of reactor may be used as the diesterification reactor. In some embodiments, the diesterification reactor(s) is(are) reaction columns. In some embodiments, the reaction columns are reactive distillation columns. The inputs to the diesterification reactors (i.e. the diesterification alcohol and the monoester) may be introduced into the diesterification reactor at any suitable location in the diesterification reactor. That is, the monoester inlet (111) and diesterification alcohol inlet (112) may be located at any suitable location in the diesterification reactor. In some embodiments, the monoester inlet and/or the diesterification alcohol inlet are located at a bottom of the reaction column. In some embodiments, the monoester inlet and/or the diesterification alcohol inlet are located at a top of the reaction column. In some embodiments, the monoester inlet and/or the diesterification alcohol inlet are located at a reaction zone of the reaction column which is not the top or bottom of the reaction column. The outputs of the diesterification reactors (i.e. the diester outlet and/or the diesterification waste outlet) may be provided by the diesterification reactor at any suitable location in or on the diesterification reactor. That is, the diester outlet (113) and the diesterification waste outlet (114) may be located at any suitable location in the diesterification reactor. In some embodiments, the diester outlet and/or the diesterification waste outlet are located at a bottom of the reaction column. In some embodiments, the diester outlet and/or the diesterification waste outlet are located at a top of the reaction column. In some embodiments, the diester outlet and/or the diesterification waste outlet are located at a reaction zone of the reaction column which is not the top or bottom of the reaction column.

The anion exchange resin columns (120) each comprise a diester inlet (121) fluidly connected to at least one of the diester outlets of one or more of the diesterification reactors, an anion exchange resin, and a deacidified diester outlet (123). Each anion exchange resin column (120) is configured to receive the crude diester stream from one or more of the diesterification reactors (110), pass the crude diester stream through the anion exchange resin to form a deacidified diester and an acidified resin, and provide a deacidified diester stream. In the exemplary embodiment depicted in FIG. 1, two anion exchange resin columns (120) are shown. In some embodiments, the system comprises one anion exchange resin column. In some embodiments, the system comprises two anion exchange resin columns. In general, there is no limit to the number of anion exchange resin columns which may be present in the system. The anion exchange resin columns may be connected in series (sequentially) or in parallel. In a parallel type connection scheme, each branch of the parallel connection scheme may contain one or more anion exchange resin columns. Each such branch may contain the same number of anion exchange resin columns or may contain a different number of anion exchange resin columns. In some embodiments, the anion exchange resin columns are connected in parallel such that a first set comprising one or more anion exchange resin columns is in use by the system to provide the deacidified diester stream while a second set comprising anion exchange resin columns is being regenerated.

Preferably, the diester outlets of the diesterification reactors are connected directly to the diester inlets of the anion exchange resin columns. In this context, "connected directly" refers to a situation in which the crude diester stream flows from the diesterification reactor(s) to the anion exchange resin column(s) without chemical changes or reactions being performed. Such chemical changes or reactions may be performed by additional components which are preferably not present in the system of the present disclosure at a location between the diesterification reactor(s) and the anion exchange resin column(s). Examples of such additional components include but are not limited to reactors, chemical separators such as separation columns, distillation columns, and chemical scrubbers, or converters. "Connected directly" however is not intended to exclude connections which allow for physical changes to the crude diester stream, equipment for carrying out such physical changes, or other equipment known to those of ordinary skill in the art necessary or advantageous for operation of the system such as valves, flow gauges, flowrate monitors, pressure gauges, pressure sensors, temperature sensors, composition analyzers, heat exchangers, and the like. For example, the crude diester stream may be heated or cooled between exiting the diesterification reactor and entering the anion exchange resin column. Such heating or cooling may be accomplished by the use of a heat exchange disposed between the diesterification reactor and the anion exchange resin column. Additional examples of such additional components include but are not limited to bypasses, pressure equalizing devices, air hammer arresters, bleed valves, liquid drains, condensate drain lines, gas removal valves, sampling ports, diverting valves, diverting lines, pressure relief devices, and the like. In some embodiments, the diester outlet of the diesterification reactor and the diester inlet of the anion exchange resin column are fluidly connected via appropriate hardware with no intervening components such as those described above. In preferred embodiments, the system of the present disclosure is devoid of chemical separators disposed between the diesterification reactor(s) and the anion exchange resin column(s).

The hydrogenation reactor (130) comprises a deacidified diester inlet (131) fluidly connected to at least one of the deacidified diester outlets of one or more of the anion exchange resin columns, a hydrogenation catalyst, a hydrogen-containing gas mixture input (132), and an oxygenated hydrocarbon outlet (133). The hydrogenation reactor (130) is configured to receive the deacidified diester stream from one or more of the anion exchange resin columns and a hydrogen-containing gas mixture, hydrogenate the diester, and provide an oxygenated hydrocarbon stream comprising an oxygenated hydrocarbon. In some embodiments, the hydrogenation reactor comprises a vaporizer. In some embodiments, the vaporizer is useful for changing the diester from a phase or state present in the deacidified diester stream (e.g. liquid or solution) to one which is more advantageous for use in the hydrogenation reactor. In some embodiments, the vaporizer is disposed in the hydrogenation reactor (130) at a location such that the deacidified diester stream encounters the vaporizer before encountering the hydrogenation catalyst. For example, the vaporizer may be useful for forming a mist, vapor, aerosol, or similar gaseous mixture comprising the diester. In some embodiments, the vaporizer forms a true vapor comprising the diester. Such a true vapor comprises a gaseous mixture comprising the diester in the gas phase and is substantially free of non-gas phase components (e.g. suspended particles or other solid phase components or droplets or other liquid phase components). Such a mist, vapor, aerosol, or gaseous mixture may then be flowed or otherwise provided to the hydrogenation catalyst. Such an output of the vaporizer may be referred to as a vaporized diester or a diester vapor. The vaporized diester may be provided to the hydrogenation catalyst separate from the hydrogen-containing gas mixture. The vaporized diester may be mixed with the hydrogen-containing gas mixture to form a hydrogenation reaction mixture before being provided to the hydrogenation catalyst.

In some embodiments, the alcohol having 1 to 3 carbon atoms present in the monoesterification alcohol stream (hereeein after "monoesterification alcohol") and the alcohol having 1 to 3 carbon atoms present in the diesterification alcohol stream (herein after "diesterification alcohol") are the same alcohol having 1 to 3 carbon atoms. In some embodiments, the monoesterification alcohol and the diesterification alcohol are different alcohols having 1 to 3 carbon atoms. In some embodiments, the monoesterification alcohol is methanol. In some embodiments, the diesterification alcohol is methanol. In some embodiments, both the monoesterification alcohol and the diesterification alcohol are methanol.

An exemplary overview of the chemical reactions performed as part of the operation of the oxygenated hydrocarbon production system are shown in Scheme 1 and Scheme 2, below. Scheme 1 depicts the esterification reactions (including monoester formation and diester formation) performed on maleic anhydride in the monoesterification reactor and the diesterification reactors. In the exemplary embodiment depicted, the monoesterification alcohol and the diesterification alcohol are methanol and the resulting diester is dimethyl maleate.

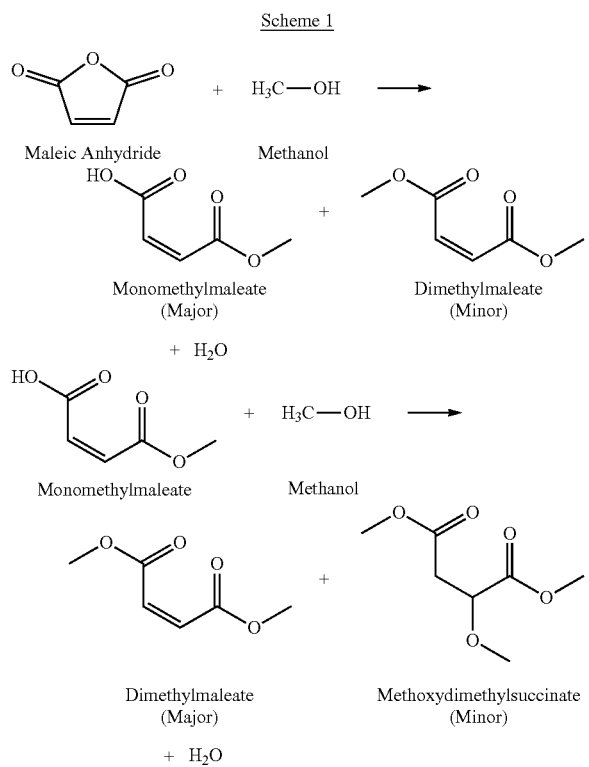

Scheme 1

The monoesterification reactor is configured to receive the maleic anhydride stream and the monoesterification alcohol stream comprising an alcohol having 1 to 3 carbon atoms, convert the maleic anhydride and alcohol to a monoester, and provide a monoester stream. The formation of the monoester in the monoesterification reactor may be performed using any suitable technique known to one of ordinary skill in the art. In some embodiments, the monoesterification involves the use of a catalyst. In some embodiments, the catalyst is an acid catalyst. The acid catalyst may be a homogeneous catalyst comprising a molecular acid, including Bronsted acids such as acids sulfuric acid, phosphoric acid, sulfamic acid, p-toluenesulfonic acid, or Lewis acids such as scandium (III) salts, zinc (II) salts, iron (III) salts, aluminum (III) salts, tin (II) salts, titanium (IV) salts, and hafnium (IV) salts. Examples of suitable salts include chloride salts, bromide salts, triflate salts, sulfate salts, carbonate salts, acetate salts, and perchlorate salts. The acid catalyst may be a heterogenous catalyst such as a polymer functionalized with acidic functional groups such as sulfonates (e.g. strong acid ion exchange resins), Lewis-acid-containing inorganic solids such as zeolites, aluminosilicates, and sulfated titania, and carbon-based catalysts such as graphene oxide and sulfonated biochar. For further discussion and additional examples of esterification catalysts, see Shanmugam, et. al., Shagufta & Dhar, Yan, et. al., and Sirsam, et. al. [S. Shanmugam, et. al., Esterification by solid acid catalysts—a comparison, Journal of Molecular Catalysis A: Chemical, 2004, 223, 1-2, 143-147; A. I. Shagufta & R. Dhar, Sulfonic Acid-Functionalized Solid Acid Catalyst in Esterification and Transesterification Reactions. Catal Surv Asia, 2017 21, 53-69; G. X. Yan, et. al., Critical review on the active site structure of sulfated zirconia catalysts and prospects in fuel production, Applied Catalysis A: General, 2019, 572, 210-225; and R. Sirsam, et. al., A Mini-Review on Solid Acid Catalysts for Esterification Reactions. J. Inst. Eng. India Ser. E, 2016, 97, 167-181]. In preferred embodiments, the monoesterification is does not involve the use of a catalyst. In some embodiments, the monoesterification has an efficiency of at least 75%, preferably at least 80%, preferably at least 85%, preferably at least 87.5%, preferably at least 90%. In this context, the efficiency refers to an amount of monoester formed from an amount of maleic anhydride. That is, an efficiency of 90% represents a reaction in which 90% of maleic anhydride supplied to the monoesterification reactor is converted into monoester. In some embodiments, the efficiency is calculated based on moles. In some embodiments, the efficiency is calculated based on weight. The remainder of the maleic anhydride may, for example, remain unreacted, be converted to maleic acid, and/or be converted to diester. In some embodiments, the monoesterification produces up to 5% diester, preferably up to 4% diester, preferably up to 3.5% diester, preferably up to 3% diester, preferably up to 2.5% diester, preferably up to 2% diester, based on a total amount of maleic anhydride supplied to the monoesterification reactor.

The diesterification reactor is configured to receive the monoester stream from the monoesterification reactor and the diesterification alcohol stream comprising an alcohol having 1 to 3 carbon atoms, convert the monoester and alcohol to a diester, and provide a diester stream. The formation of the diester in the diesterification reactor may be performed using any suitable technique known to one of ordinary skill in the art as described above. In some embodiments, the diesterification involves the use of a catalyst as described above. In some embodiments, the diesterification is performed using a catalyst resin comprising a polymer functionalized with acidic groups. In some embodiment, the catalyst resin comprises a polymer functionalized with sulfonic acid groups.

In some embodiments the diesterification has an efficiency of at least 75%, preferably at least 80%, preferably at least 85%, preferably at least 87.5%, preferably at least 90%, preferably at least 95%. In this context, the efficiency refers to an amount of diester formed from an amount of monoester. That is, an efficiency of 95% would be a reaction in which 95% of monoester supplied to the diesterification reactor is converted into diester. In some embodiments, the efficiency is calculated based on moles. In some embodiments, the efficiency is calculated based on weight. The remainder of the monoester may, for example, remain unreacted, be converted to maleic acid, and/or be converted to an alkoxylated ester. An example of such an alkoxylated ester is methoxydimethylsuccinate, formed from the alkoxylation of dimethylmaleate. In some embodiments, the diesterification produces a crude diester stream comprising less than 10.0 mol % acid-containing species, preferably less than 9.5 mol % acid-containing species, preferably less than 9.0 mol % acid-containing species, preferably less than 8.5 mol % acid-containing species, preferably less than 8.0 mol % acid-containing species, preferably less than 7.5 mol % acid-containing species, preferably less than 7.0 mol % acid-containing species, preferably less than 6.5 mol % acid-containing species, preferably less than 6.0 mol % acid-containing species, preferably less than 5.5 mol % acid-containing species, preferably less than 5.0 mol % acid-containing species, preferably less than 4.5 mol % acid-containing species, preferably less than 4.0 mol % acid-containing species, preferably less than 3.75 mol % acid-containing species, preferably less than 3.5 mol % acid-containing species, preferably less than 3.25 mol % acid-containing species, preferably less than 3.0 mol % acid-containing species based on a total number of moles of maleic anhydride derivatives present in the crude diester stream. The maleic anhydride derivatives include, but are not limited to maleic acid, maleic acid monoester, maleic acid diester, alkoxylated derivates of maleic acid as described above, and other derivatives formed by addition of chemical species to the alkene functional group of maleic acid such as succinic acid, succinic acid monoester, and succinic acid diester. In general, "acid-containing species" refers to any organic acid, inorganic acid, or any chemical species which produces an organic or inorganic acid under the conditions present in the crude diester stream. Examples of acid-containing species include, but are not limited to maleic anhydride, maleic acid, maleic acid monoester, alkoxylated derivates of maleic acid bearing a carboxylic acid functional group as described above, other derivatives formed by addition of chemical species to the alkene functional group of maleic acid and/or maleic anhydride such as succinic anhydride succinic acid, and succinic acid monoester, sulfonic acid functional group containing derivatives of maleic acid or succinic acid, and the like. In some embodiments, the acid-containing species may be at least one selected from the group consisting of maleic acid and monoester. In some embodiments, the monoester is present in the crude diester stream in an amount of greater than 0.5 mol % to 10 mol %, preferably 0.6 to 9.0 mol %, preferably 0.75 to 8.0 mol %, preferably 1.0 to 7.5 mol %, preferably 1.25 to 7.0 mol %, preferably 1.5 to 6.5 mol %, preferably 1.75 to 6.0 mol %, preferably 2.0 to 5.5 mol %, preferably 2.25 to 5.0 mol %, preferably 2.5 to 4.5 mol %, preferably 2.75 to 4.0 mol %, preferably 2.9 to 3.5 mol %, preferably 3.0 to 3.25 mol % based on a total number of moles of maleic anhydride derivatives present in the crude diester stream. In some embodiments, the crude diester stream is substantially free of sulfur-containing substances.

The anion exchange resin may be any suitable anion exchange resin known to one of ordinary skill in the art. Anion exchange resins are typically classified based on the nature of functional groups present in the resin. Strongly basic anion exchange resins typically comprise quaternary ammonium functional groups and chloride or hydroxide counter ions. Weakly basic anion exchange resins typically comprise amine functional groups. These amine functional groups may be primary amines, secondary amines, tertiary amines, or combinations thereof. In some embodiments, the anion exchange resin is a weakly basic anion exchange resin. In some embodiments, the weakly basic anion exchange resin comprises primary, secondary, and or tertiary amine functional groups. In some embodiments, the weakly basic anion exchange resin comprises tertiary amine functional groups.

These functional groups are typically present on a substrate. The substrate may be an inorganic material such as a zeolite, silica, or metal-organic framework, or the like. The substrate may also be a polymer. The polymer may contain a polymer backbone which is substantially devoid of the basic functional groups described above, for example polystyrene, polystyrene-divinylbenzene copolymer, polyethylene, polypropylene, polymethylmethacrylate, polymethacrylate, and the like. The polymer may contain a polymer backbone which contains the basic functional groups described above, for example polyethyleneimine, poly(acrylamido-N-propyltrimethylammonium chloride) (polyAPTAC), poly[(3-(methacryloylamino)-propyl]trimethylammonium chloride) (polyMAPTAC), polyacrylamide, and the like.

Such polymer-containing anion exchange resins are typically in the form of polymer beads, the polymer beads being composed of or being coating with a polymer containing the functional groups described above. Such polymer beads may be non-porous or porous. Porous polymer beads may be macroporous, microporous, or both. In some embodiments, the anion exchange resin comprises polymer beads. In some embodiments, the weakly basic anion exchange resin comprises polymer beads comprising primary, secondary, and/or tertiary amine functional groups. In preferred embodiments, the polymer beads comprise tertiary amine functional groups. In some embodiments, the polymer beads are polystyrene beads. In preferred embodiments, the polystyrene beads are crosslinked polystyrene or a polystyrene-divinylbenzene copolymer. In some embodiments, the polymer beads have a mean size of 250 to 750 µm, preferably 275 to 725 µm, preferably 300 to 700 µm, preferably 325 to 675 µm, preferably 350 to 650 µm, preferably 375 to 625 µm, preferably 400 to 600 µm, preferably 425 to 575 µm, preferably 450 to 550 µm, preferably 475 to 525 µm, preferably 500 µm. Examples of suitable ion exchange resins include, but are not limited to DOWEX®-M43 available from Dow, Purolite® A100DrPlus available from Purolite and Tulsion® TAN-21 from Thermax. In some embodiments, the anion exchange resin is used in an amount of 0.1 to 1.5 mL of resin per mL of crude diester stream, preferably 0.125 to 1.35 mL, preferably 0.15 to 1.25 mL, preferably 0.175 to 1.20 mL, preferably 0.20 to 1.150 mL, preferably 0.22 to 1.1 mL of resin per mL of crude diester stream.

The anion exchange resin removes the acid-containing species present in the crude diester stream to produce the deacidified diester stream and an acidified resin. The acidified resin comprises acid-containing species removed from the crude diester stream. The anion exchange resin may have an anion exchange capacity. The anion exchange capacity refers to a total amount of acid-containing species which may be removed by the anion exchange resin. The action of the anion exchange resin in removing acid-containing species and producing the acidified resin depletes the anion exchange capacity. The acidified resin is incapable of acting in the anion exchange reaction of the anion exchange resin. A resin in which an entirety of the anion exchange resin has been converted to acidified resin may be referred to as a saturated resin or an exhausted resin. Such a saturated resin or exhausted resin is incapable of removing acid-containing species present in the crude diester stream. In some embodiments, the deacidified diester stream comprises less than 0.5 mol %, preferably less than 0.45 mol %, preferably less than 0.40 mol %, preferably less than 0.35 mol %, preferably less than 0.30 mol %, preferably less than 0.25 mol %, preferably less than 0.20 mol %, preferably less than 0.15 mol %, preferably less than 0.125 mol %, preferably less than 0.10 mol %, preferably less than 0.075 mol %, preferably less than 0.05 mol %, preferably less than 0.025 mol %, preferably less than 0.020 mol %, preferably less than 0.01 mol %, preferably less than 0.005 mol % acid-containing species, based on a total number of moles of maleic anhydride derivatives present in the deacidified diester stream. In some embodiments, the deacidified diester stream comprises less than 0.5 mol %, preferably less than 0.45 mol %, preferably less than 0.40 mol %, preferably less than 0.35 mol %, preferably less than 0.30 mol %, preferably less than 0.25 mol %, preferably less than 0.20 mol %, preferably less than 0.15 mol %, preferably less than 0.125 mol %, preferably less than 0.10 mol %, preferably less than 0.075 mol %, preferably less than 0.05 mol %, preferably less than 0.025 mol %, preferably less than 0.020 mol %, preferably less than 0.01 mol %, preferably less than 0.005 mol % monoester, based on a total number of moles of maleic anhydride derivatives present in the deacidified diester stream. The removal of acid-containing species, including but not limited to the monoester, may be advantageous for using the deacidified diester stream in the hydrogenation step. This removal may prolong the life of, decrease the required maintenance of, increase the efficiency of, and/or decrease the rate of degradation of the hydrogenation catalyst. This removal may be advantageous for increasing safety factors of the oxygenated hydrocarbon production system.

The hydrogenation reactor comprises a hydrogenation catalyst. In general, the hydrogenation catalyst may be any suitable hydrogenation catalyst known to one of ordinary skill in the art. In some embodiments, the hydrogenation is a homogeneous hydrogenation catalyst. Homogeneous hydrogenation catalysts are typically molecular species comprising one or more metal centers and one or more organic ligands coordinated to the metal center(s). Examples of metals commonly used in homogeneous hydrogenation catalysts include copper, nickel, ruthenium, rhodium, iridium, platinum, palladium, osmium, iron, cobalt, and manganese. For additional information on homogenous hydrogenation catalysts, particularly for ester hydrogenation, see Werkmeister, et. al., Clarke, and Pandey & Choudhury [Werkmeister, S., et. al., Org. Process Res. Dev. 2014, 18, 2, 289-302; Clarke, M. L., Catal. Sci. Technol., 2012, 2, 2418-2423; and Pandey, M. K. & Choudhury, J., ACS Omega 2020, 5, 48, 30775-30786]. In some embodiments, the hydrogenation is a heterogeneous hydrogenation catalyst. Heterogeneous hydrogenation catalysts typically comprise a support material and a catalytic metal. Examples of metals commonly used as catalytic metals include copper, nickel, ruthenium, rhodium, iridium, platinum, palladium, osmium, iron, cobalt, and manganese. The catalytic metal may be disposed on a surface of the support material as particles such as nanoparticles, incorporated into the structure of the support material for example as structural dopants, or grafted onto the support using a grafting material such as a polymer or chelating ligand bound to the support material. Typically, the support material is porous and/or has high surface area, typically in excess of 50 m$^2$/g to 250 m$^2$/g or greater. Examples of commonly-used support materials include silica, alumina, magnesium oxide, barium carbonate, barium sulfate, activated carbon, zirconium oxide, cerium oxide, and mixtures thereof. For additional information on heterogeneous hydrogenation catalysts, see Pritchard, et. al., Hutchings, et. al., and Strekalova, et. al. [Pritchard, J., et. al., Chem. Soc. Rev., 2015, 44, 3808-3833; Hutchings, G. J., et. al., Science Progress (1999), 82 (3), 233-250; and Strekalova, A. A., et. al., Catal. Sci. Technol., 2021, 11, 7229-7238]. In general, the hydrogenation may be performed using the hydrogenation reactor using any suitable reaction parameters known to one of ordinary skill in the art. Examples of such parameters which may take specific appropriate values include, but are not limited to hydrogen partial pressure, total gas pressure, temperature, hydrogen flow rate, total gas flowrate, catalyst loading, deacidified diester flow rate, and hydrogen:diester ratio.

Scheme 2 depicts exemplary hydrogenation reactions performed on the dimethylmaleate to produce oxygenated hydrocarbons including tetrahydrofuran, 1,4-butanediol, and gamma butyrolactone.

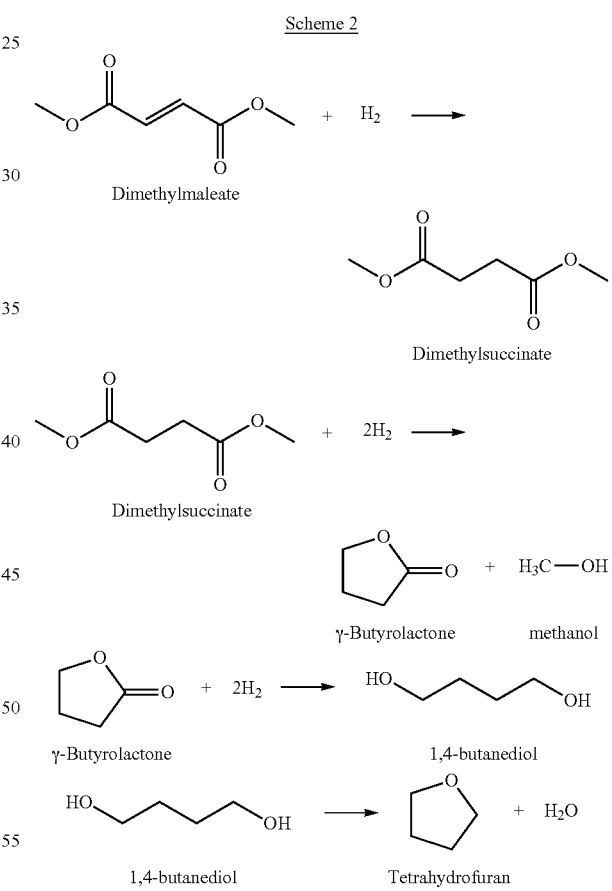

Figure 2:
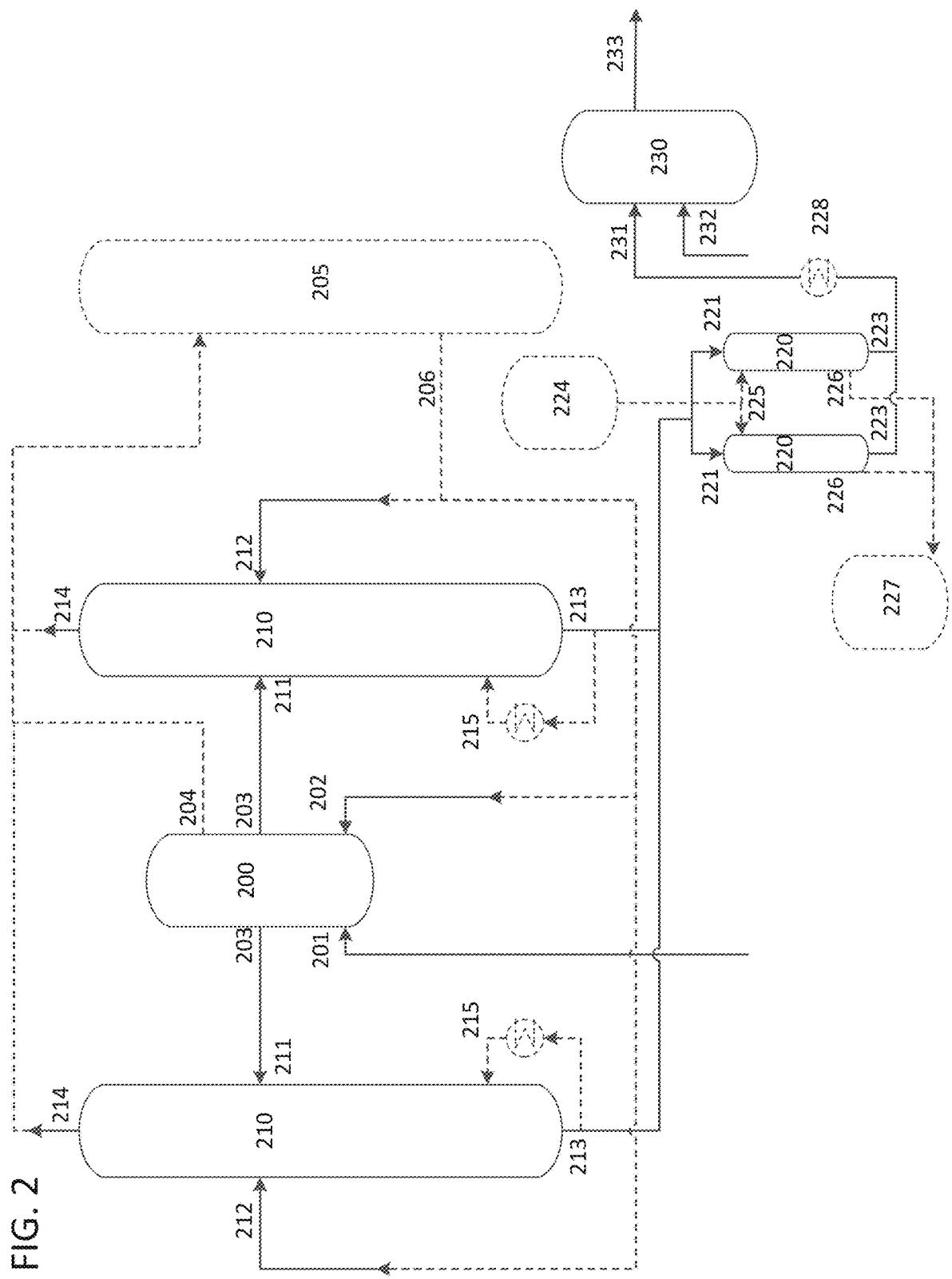
FIG. 2 shows a schematic drawing of an exemplary embodiment of the oxygenated hydrocarbon production with various additional components which may be advantageous to include.

Referring now to FIG. 2, an exemplary embodiment of the oxygenated hydrocarbon production system of the present disclosure is shown with various additional components which may be advantageous to include, may be included as a matter of standard practice by one of ordinary skill in the art, and/or which were omitted from FIG. 1 for the sake of clarity.

As discussed previously, the monoesterification reactor (200) comprises a maleic anhydride inlet (201), a monoesterification alcohol inlet (202), and one or more monoester outlets (203) configured as described above. In the exemplary embodiment depicted in FIG. 2, the monoesterification reactor further comprises a monoesterification waste outlet (204). This monoesterification waste outlet may be fluidly connected to an alcohol recycling system (205). Additionally, the diesterification waste outlet (214) of the diesterification reactors (210) may also be fluidly connected to an alcohol recycling system (205). The alcohol recycling system (205) is configured to receive from the monoesterification waste outlet (204), the diesterification waste outlet (214), or both, an impure alcohol stream. The impure alcohol stream comprises the monoesterification alcohol and/or the diesterification alcohol. The impure alcohol stream may further comprise a non-alcohol component such as water, the monoester, the diester, maleic anhydride, or an alkoxylated ester. An example of such an alkoxylated ester is methoxydimethylsuccinate, formed from the alkoxylation of dimethylmaleate. The alcohol recycling system separates the alcohol from the non-alcohol component(s) present in the impure alcohol stream to produce a purified alcohol stream. Such separation may be performed using any suitable technique known to one of ordinary skill in the art. In some embodiments the alcohol is separated from the non-alcohol component(s) by distillation. In such an embodiment, the alcohol recycling system (205) comprises one or more distillation columns. The purified alcohol stream comprises the monoesterification alcohol and/or the diesterification alcohol. The purified alcohol stream may further comprise a non-alcohol component such as water, the monoester, the diester, maleic anhydride, or an alkoxylated ester. Such non-alcohol components may be present in a lower concentration in the purified alcohol stream which is being output from the alcohol recycling system when compared to the impure alcohol stream which is being supplied to the alcohol recycling system. The purified alcohol stream may be supplied from the alcohol recycling system to the monoesterification reactor (200) and/or the diesterification reactors (210). The supplying may be accomplished by appropriate connection of a purified alcohol outlet (206) of the alcohol recycling system (205) to the monoesterification alcohol inlet (202) of the monoesterification reactor (200) and/or the diesterification alcohol inlet (212) of the diesterification reactor (210). The alcohol recycling system may further comprise an incoming alcohol heat exchanger which is configured to heat the impure alcohol stream being supplied to the alcohol recycling system and cool the monoesterification reactor, the dieserification reactors, the monoester stream, the diester stream, and/or any other suitable component or stream in the system. In the exemplary embodiment depicted in FIG. 2 and described herein, a single alcohol recycling system is shown. The alcohol recycling system is depicted as a single distillation column.

In some embodiments, a crude diester heat exchanger (215) is fluidly connected to the crude diester outlet (213). The crude diester heat exchanger (215) may also be fluidly connected to a crude diester bypass or crude diester return which provides the crude diester stream back to the diesterification reactor (210). In some embodiments, a deacidified diester heat exchanger (228) is disposed between the anion exchange columns and the hydrogenation reactor. This deacidified diester heat exchanger may be used to heat or cool the deacidified diester stream before it enters the hydrogenation reactor (230).

In some embodiments, the oxygenated hydrocarbon production system further comprises an anion exchange resin regeneration subsystem. This subsystem is shown the exemplary embodiment depicted in FIG. 2. In some embodiments, the anion exchange resin regeneration subsystem comprises a regeneration solution storage tank (224) in which a regeneration solution may be stored. The regeneration solution storage tank (224) is fluidly connected to a regeneration solution inlet (225) on the anion exchange resin columns (220). The anion exchange resin columns (220) each further comprise a regeneration solution outlet (226). These regeneration solution outlet(s) are fluidly connected to a depleted solution disposal unit (227). The anion exchange resin regeneration subsystem is configured such that, when a regeneration procedure is performed, the regeneration solution flows from the regeneration solution storage tank through one or more anion exchange resin columns containing the acidified resin. The regeneration solution acts to both remove acidic components from the depleted resin and reform the anion exchange resin, thereby forming a depleted solution. The depleted solution then flows into the depleted solution disposal unit (227).

The regeneration solution comprises a strong base. In some embodiments, the regeneration solution is an aqueous solution of a strong base. In some embodiments, the strong base is an alkali metal hydroxide. No specific concentration of strong base is required for the regeneration solution, as a larger volume of a lower concentration regeneration solution may perform substantially equivalent to a lower volume of a higher concentration regeneration solution in a regeneration procedure. In a preferred embodiment, a sufficient amount of strong base is flowed through the acidified resin to reform the anion exchange resin with greater than 50%, preferably greater than 55%, preferably greater than 60%, preferably greater than 65%, preferably greater than 70%, preferably greater than 75%, preferably greater than 80%, preferably greater than 85%, preferably greater than 90%, preferably greater than 92.5%, preferably greater than 95% of an anion exchange capacity based on an initial anion exchange capacity of the anion exchange resin.

Scheme 3 below depicts an exemplary embodiment of a cycle comprising use of the anion exchange resin to remove acid-containing species from the crude ester stream to form an acidified resin and a regeneration process to reform the anion exchange resin. In some embodiments, the regeneration process is initiated when the anion exchange resin has been converted to an exhausted resin. In some embodiments, the regeneration process is initiated when the anion exchange resin has been partially converted to the acidified resin but before being fully converted to an exhausted resin. In such embodiments, the regeneration process may be initiated at any suitable time after any degree of resin acidification.

Scheme 3

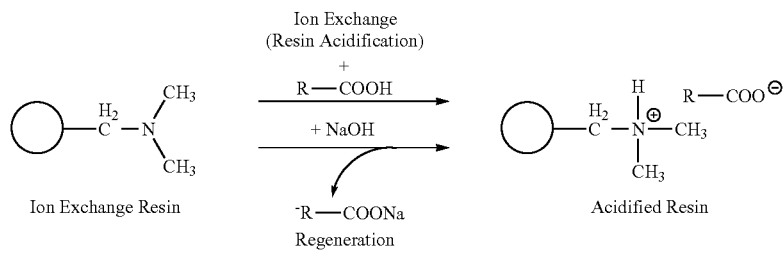

Method of Producing an Oxygenated Hydrocarbon

The present disclosure also relates to a method of producing an oxygenated hydrocarbon, the method comprising monoesterifying maleic anhydride with a monoesterification alcohol having 1 to 3 carbon atoms to form a monoester stream comprising a maleic acid monoester, diesterifying the maleic acid monoester with a diesterification alcohol having 1 to 3 carbon atoms to form a crude diester stream comprising a maleic acid diester, passing the crude diester stream through an anion exchange resin to form a deacidified diester stream and an acidified resin, and hydrogenating the deacidified diester stream using hydrogen gas and a hydrogenation catalyst to form an oxygenated hydrocarbon, wherein the oxygenated hydrocarbon is at least one selected from the group consisting of tetrahydrofuran, 1,4-butanediol, and gamma butyrolactone, and the deacidified diester stream comprises less than 0.5 mol % maleic acid monoester based on a total number of moles of maleic anhyride derivatives present in deacidified diester stream. In some embodiments, the crude diester stream comprises a maleic acid monoester and a maleic acid diester.

In general, the monoesterifying may be performed as described above. In some embodiments, the diesterifying may be performed as described above. In such embodiments, the crude diester stream may comprise greater than 0.5 mol % to 10 mol %, preferably 0.6 to 9.0 mol %, preferably 0.75 to 8.0 mol %, preferably 1.0 to 7.5 mol %, preferably 1.25 to 7.0 mol %, preferably 1.5 to 6.5 mol %, preferably 1.75 to 6.0 mol %, preferably 2.0 to 5.5 mol %, preferably 2.25 to 5.0 mol %, preferably 2.5 to 4.5 mol %, preferably 2.75 to 4.0 mol %, preferably 2.9 to 3.5 mol %, preferably 3.0 to 3.25 mol % an acid-containing species based on a total number of moles of maleic anhydride derivatives present in the crude diester stream. The acid-containing species may be as described above. In some embodiments, the acid-containing species may be at least one selected from the group consisting of maleic acid and monoester. In such embodiments, the crude diester stream may further comprise greater than 0.5 mol % to 10 mol %, preferably 0.6 to 9.0 mol %, preferably 0.75 to 8.0 mol %, preferably 1.0 to 7.5 mol %, preferably 1.25 to 7.0 mol %, preferably 1.5 to 6.5 mol %, preferably 1.75 to 6.0 mol %, preferably 2.0 to 5.5 mol %, preferably 2.25 to 5.0 mol %, preferably 2.5 to 4.5 mol %, preferably 2.75 to 4.0 mol %, preferably 2.9 to 3.5 mol %, preferably 3.0 to 3.25 mol % an maleic acid monoester based on a total number of moles of maleic anhydride derivatives present in the crude diester stream.

In some embodiments, the deacidified diester stream comprises less than 0.5 mol %, preferably less than 0.45 mol %, preferably less than 0.40 mol %, preferably less than 0.35 mol %, preferably less than 0.30 mol %, preferably less than 0.25 mol %, preferably less than 0.20 mol %, preferably less than 0.15 mol %, preferably less than 0.125 mol %, preferably less than 0.10 mol %, preferably less than 0.075 mol %, preferably less than 0.05 mol %, preferably less than 0.025 mol %, preferably less than 0.020 mol %, preferably less than 0.01 mol %, preferably less than 0.005 mol % acid-containing species, based on a total number of moles of maleic anhydride derivatives present in the deacidified diester stream. In some embodiments, the deacidified diester stream comprises less than 0.5 mol %, preferably less than 0.45 mol %, preferably less than 0.40 mol %, preferably less than 0.35 mol %, preferably less than 0.30 mol %, preferably less than 0.25 mol %, preferably less than 0.20 mol %, preferably less than 0.15 mol %, preferably less than 0.125 mol %, preferably less than 0.10 mol %, preferably less than 0.075 mol %, preferably less than 0.05 mol %, preferably less than 0.025 mol %, preferably less than 0.020 mol %, preferably less than 0.01 mol %, preferably less than 0.005 mol % maleic acid monoester, based on a total number of moles of maleic anhydride derivatives present in the deacidified diester stream.

In preferred embodiments, the crude diester stream is substantially free of sulfur-containing substances.

In some embodiments, the monoesterification alcohol having 1 to 3 carbon atoms is methanol. In some embodiments, the diesterification alcohol having 1 to 3 carbon atoms is methanol. In some embodiments, both the monoesterification alcohol and diesterification alcohol are methanol as described above. In some embodiments, the anion exchange resin is as described above. In some embodiments, the method further comprises regenerating the anion exchange resin by washing the acidified resin with a strong base solution comprising a hydroxide base to reform the anion exchange resin as described above. In preferred embodiments, the hydroxide base is an alkali metal hydroxide base.

It should be understood that the figures and descriptions herein are intended to convey to one of ordinary skill in the art the main components and the connections therebetween to be able to construct and operate the oxygenated hydrocarbon production system of and practice the method of the present disclosure. It should be understood that various other components, such as valves, flow gauges, flowrate monitors, pressure gauges, pressure sensors, temperature sensors, composition analyzers, heat exchangers, and the like, may be present at appropriate locations in the system. Further, additional connections not depicted may be present at appropriate locations between appropriate components, such as pressure interconnects, diversion pathways, maintenance or cleaning pathways, bypass pathways, and the like.

The examples below are intended to further illustrate protocols for the construction and/or configuration as well as the operation of the system and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Figure 3:
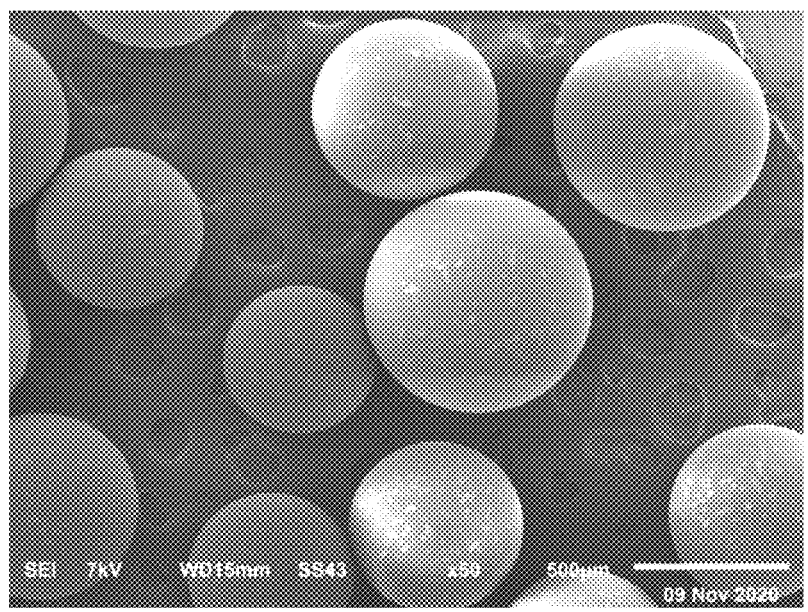
FIG. 3 shows an SEM image showing the polymer beads in an exemplary anion exchange resin.
Figure 4A:
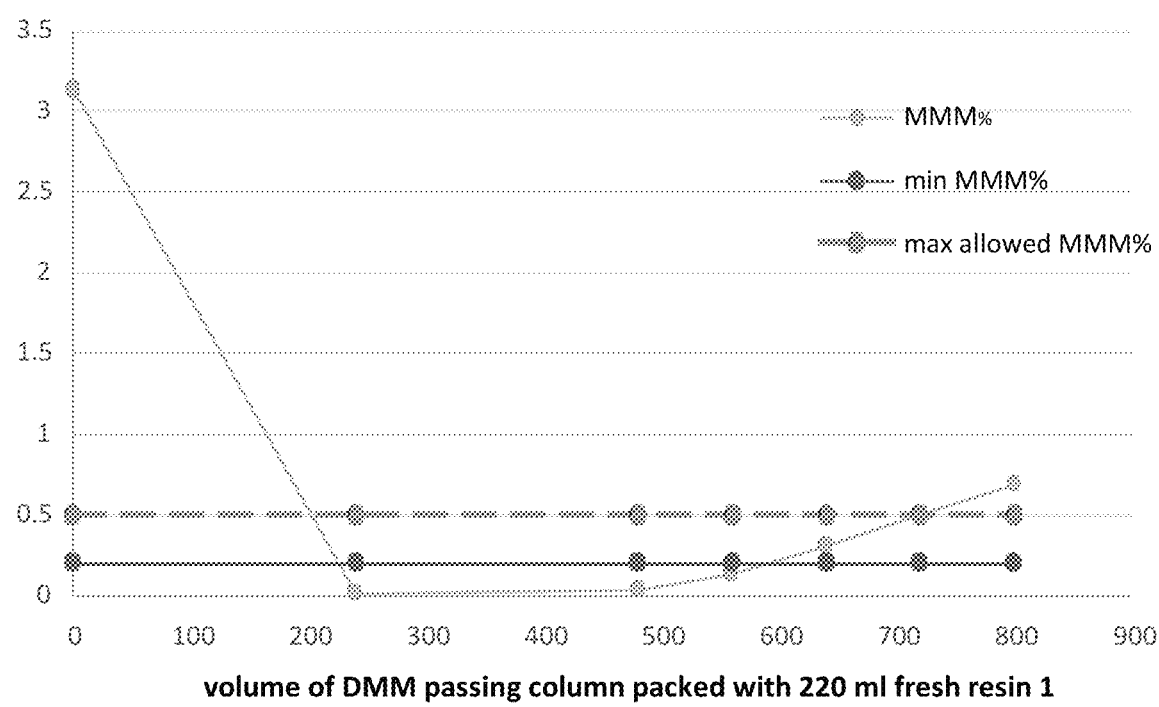
FIGS. 4A and 4B are plots of a measured percentage of monomethylmaleate (MMM) present in a diester stream after passing through an anion exchange resin.
Figure 4B:
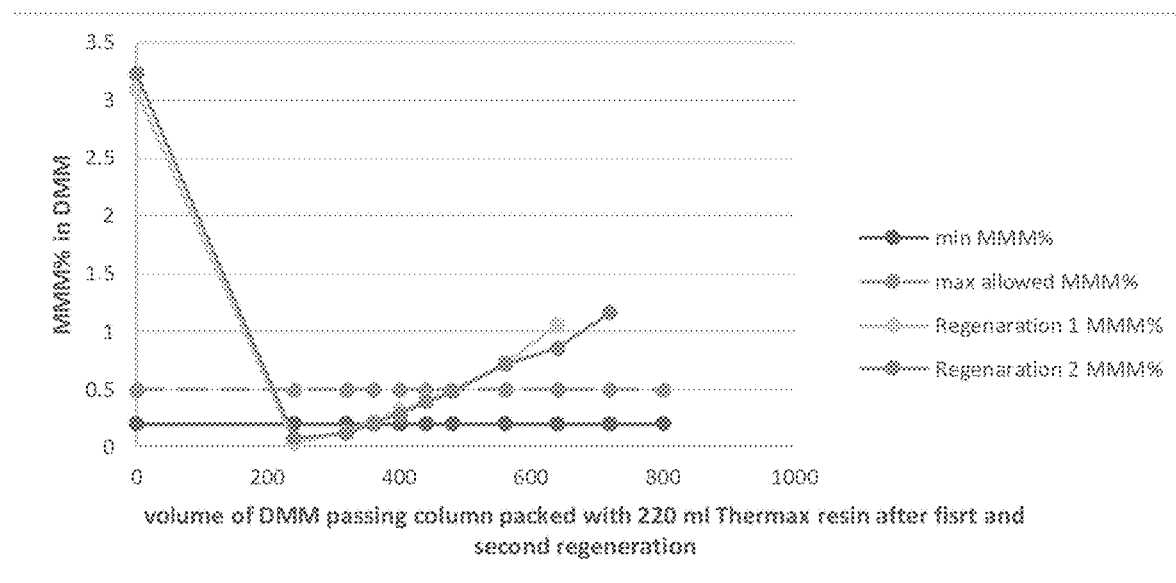

Dimethylmaleate (DMM) was dosed with monomethylmaleate (MMM) such that the acidity level was about 3%, mimicking plant upset. This mixture was passed through one of the commercially available resins. These resins comprised polymer beads bearing various organic acid groups, particularly sulfonic acid groups. An SEM image of the resin is shown in FIG. 3. Visible in the image are substantially spherical, porous beads having a mean bead size of approximately 500 μm. Fractions of the acid removed DMM were collected in 40 ml vials and the acidity of those fractions was measured. At resin exhaustion, when the acid concentration was above 0.5% in one of such fractions, the resin was regenerated by means of sodium hydroxide solution. The resin was used repeatedly for two more cycles after regeneration. Preliminary results are shown in FIGS. 4A and 4B demonstrating acid removal (see FIG. 4A) and resin regeneration (see FIG. 4B).

The invention claimed is:

1. A method of producing an oxygenated hydrocarbon, the method comprising:
monoesterifying maleic anhydride with a monoesterification alcohol having 1 to 3 carbon atoms to form a monoester stream comprising a maleic acid monoester;
diesterifying the maleic acid monoester with a diesterification alcohol having 1 to 3 carbon atoms to form a crude diester stream comprising a maleic acid diester;
passing the crude diester stream through an anion exchange resin to form a deacidified diester stream and an acidified resin; and
hydrogenating the deacidified diester stream using hydrogen gas and a hydrogenation catalyst to form an oxygenated hydrocarbon, wherein:
the oxygenated hydrocarbon is at least one selected from the group consisting of tetrahydrofuran, 1,4-butanediol, and gamma butyrolactone; and
the deacidified diester stream comprises less than 0.5 mol % maleic acid monoester based on a total number of moles of maleic anhyride derivatives present in deacidified diester stream.

2. The method of claim 1, wherein the monoesterification alcohol having 1 to 3 carbon atoms and the diesterification alcohol having 1 to 3 carbon atoms are methanol.

3. The method of claim 1, wherein the anion exchange resin is a weakly basic anion exchange resin.

4. The method of claim 3, wherein the weakly basic anion exchange resin comprises polymer beads comprising primary, secondary, and/or tertiary amine functional groups.

5. The method of claim 4, wherein the polymer beads are polystyrene beads.

6. The method of claim 4, wherein the polymer beads have a mean size of 250 to 750 μm.

7. The method of claim 4, wherein the polymer beads comprise tertiary amine functional groups.

8. The method of claim 1, further comprising regenerating the anion exchange resin by washing the acidified resin with a strong base solution comprising a hydroxide base to reform the anion exchange resin.

9. The method of claim 8, wherein the hydroxide base is an alkali metal hydroxide base.

10. The method of claim 1, wherein the crude diester stream comprises the maleic acid monoester and the maleic acid diester.

11. The method of claim 10, wherein the maleic acid monoester is present in an amount of greater than 0.5 mol % to 10 mol %, based on a total number of moles of maleic anhydride derivatives present in the crude diester stream.

12. The method of claim 1, wherein the crude diester stream is substantially free of sulfur-containing substances.

* * * * *